(12) United States Patent
Ren et al.

(10) Patent No.: US 11,423,351 B2
(45) Date of Patent: Aug. 23, 2022

(54) BLOCKCHAIN-BASED FOOD PRODUCT SHELF-LIFE MANAGEMENT

(71) Applicant: International Business Machines Corporation, Armonk, NY (US)

(72) Inventors: Changrui Ren, Beijing (CN); Bing Shao, Beijing (CN); Ning Sun, Beijing (CN); Bo Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 677 days.

(21) Appl. No.: 15/380,476

(22) Filed: Dec. 15, 2016

(65) Prior Publication Data
US 2018/0174094 A1 Jun. 21, 2018

(51) Int. Cl.
*G06Q 10/08* (2012.01)
*G06F 21/64* (2013.01)
*H04L 9/32* (2006.01)
*H04L 9/00* (2022.01)

(52) U.S. Cl.
CPC ........... *G06Q 10/087* (2013.01); *G06F 21/64* (2013.01); *H04L 9/3239* (2013.01); *H04L 9/50* (2022.05)

(58) Field of Classification Search
CPC ..... G06Q 10/087; G06F 21/64; H04L 9/3239; H04L 2209/38
See application file for complete search history.

(56) References Cited

U.S. PATENT DOCUMENTS

| | | | | |
|---|---|---|---|---|
| 9,641,342 B2* | 5/2017 | Sriram | .................. | H04L 63/126 |
| 9,985,964 B2* | 5/2018 | Andrade | ................. | H04L 63/08 |
| 2003/0061121 A1* | 3/2003 | Ouchi | .................... | G06Q 30/06 |
| | | | | 705/26.5 |
| 2003/0221107 A1* | 11/2003 | Kang | ..................... | G06F 21/10 |
| | | | | 713/176 |
| 2004/0064537 A1* | 4/2004 | Anderson | ............... | H04L 63/12 |
| | | | | 709/223 |
| 2005/0259818 A1* | 11/2005 | Silverbrook | ........... | G06Q 50/22 |
| | | | | 380/55 |
| 2007/0022294 A1* | 1/2007 | Lapstun | ................ | H04L 9/3247 |
| | | | | 713/176 |
| 2007/0061888 A1* | 3/2007 | Selinfreund | ..... | G11B 20/00253 |
| | | | | 726/26 |
| 2008/0116271 A1* | 5/2008 | Holz | .................... | G06K 7/0004 |
| | | | | 235/435 |
| 2008/0133929 A1* | 6/2008 | Gehrmann | .............. | G06F 21/51 |
| | | | | 713/179 |

(Continued)

OTHER PUBLICATIONS

Tian, Feng. "An agri-food supply chain traceability system for China based on RFID & blockchain technology." 2016 13th international conference on service systems and service management (ICSSSM). IEEE, 2016.*

(Continued)

*Primary Examiner* — Asfand M Sheikh (57) ABSTRACT

A blockchain of transactions may be referenced for various purposes and may be later accessed by interested parties for ledger verification. One example method of operation may comprise one or more of identifying a production date associated with a product, creating a unique code to represent the production date and the product based on a hash of one or more blocks of a blockchain, and forwarding the unique code to a verification server to verify the product.

17 Claims, 7 Drawing Sheets

(56) References Cited

U.S. PATENT DOCUMENTS

| | | | | |
|---|---|---|---|---|
| 2009/0108080 A1* | 4/2009 | Meyer | | G06Q 20/14 |
| | | | | 235/494 |
| 2011/0082795 A1* | 4/2011 | Wilde | | G06Q 30/0283 |
| | | | | 705/50 |
| 2013/0138491 A1* | 5/2013 | Gao | | G06Q 30/0225 |
| | | | | 705/14.23 |
| 2015/0317644 A1* | 11/2015 | Chanez | | G06Q 30/0185 |
| | | | | 705/51 |
| 2015/0332283 A1 | 11/2015 | Witchey | | |
| 2016/0012424 A1 | 1/2016 | Simon et al. | | |
| 2016/0028552 A1* | 1/2016 | Spanos | | H04L 9/3297 |
| | | | | 713/178 |
| 2016/0042388 A1* | 2/2016 | Chater | | H04L 67/535 |
| | | | | 705/14.45 |
| 2016/0098723 A1* | 4/2016 | Feeney | | G06Q 20/4016 |
| | | | | 705/75 |
| 2016/0098730 A1* | 4/2016 | Feeney | | G06Q 30/0185 |
| | | | | 705/71 |
| 2016/0164884 A1 | 6/2016 | Sriram et al. | | |
| 2016/0259937 A1* | 9/2016 | Ford | | G06F 21/554 |
| 2016/0275309 A1* | 9/2016 | Austin | | G06F 21/6254 |
| 2016/0283920 A1* | 9/2016 | Fisher | | H04L 9/3297 |
| 2016/0284033 A1* | 9/2016 | Winand | | H04L 9/0637 |
| 2017/0017919 A1* | 1/2017 | Haimi | | G06Q 10/087 |
| 2017/0046698 A1* | 2/2017 | Haldenby | | G06Q 20/0655 |
| 2017/0046709 A1* | 2/2017 | Lee | | G06Q 20/0655 |
| 2017/0046806 A1* | 2/2017 | Haldenby | | G06Q 40/128 |
| 2017/0075938 A1* | 3/2017 | Black | | G06F 21/64 |
| 2017/0126702 A1* | 5/2017 | Krishnamurthy | | G06F 21/604 |
| 2017/0163733 A1* | 6/2017 | Grefen | | H04L 9/3236 |
| 2017/0300905 A1* | 10/2017 | Withrow | | G06Q 10/087 |
| 2017/0329980 A1* | 11/2017 | Hu | | H04L 63/04 |
| 2017/0353309 A1* | 12/2017 | Gray | | G06F 21/51 |
| 2018/0120225 A1* | 5/2018 | Ditterich | | G01N 21/85 |
| 2018/0130034 A1* | 5/2018 | Taylor | | G06Q 20/02 |
| 2018/0284093 A1* | 10/2018 | Brown | | G01N 33/02 |

OTHER PUBLICATIONS

Crosby, Michael, et al. "Blockchain technology: Beyond bitcoin." Applied Innovation 2.6-10 (2016): 71. (Year: 2016).*

Abeyratne, Saveen A., and Radmehr P. Monfared. "Blockchain ready manufacturing supply chain using distributed ledger." International Journal of Research in Engineering and Technology 5.9 (2016): 1-10. (Year: 2016).*

Schatsky, David, and Craig Muraskin. "Beyond bitcoin." Blockchain is Coming to Disrupt Your Industry (2015). (Year: 2015).*

Yiannas, Frank. "A new era of food transparency powered by blockchain." Innovations: Technology, Governance, Globalization 12.1-2 (2018): 46-56. (Year: 2018).*

Kamath, Reshma. "Food traceability on blockchain: Walmart's pork and mango pilots with IBM." The Journal of the British Blockchain Association 1.1 (2018): 3712. (Year: 2018).*

Brewster, Christopher, "Semantic Blockchains in the Supply Chain," slide presentation, Aston University, 2015, http://www.cbrewster.com/docs/talks/20150617_TNO.pdf.

* cited by examiner

FIG. 4

BLOCKCHAIN-BASED FOOD PRODUCT SHELF-LIFE MANAGEMENT

TECHNICAL FIELD

This application relates to using a blockchain to track production of products, and more particularly, to blockchain-based food product shelf-life management.

BACKGROUND

Products are manufactured and shipped to consumers on a daily basis. There are many incidents in the retail industry caused by illegal and counterfeit activities in supermarkets or retail stores, for example. These incidents create a trust gap between consumers and perishable product distributors as well as other retailers. Consumers now demand more information about product origin, processes and company practices.

Conventional methods for food product shelf-life management in retail stores can mainly be categorized into managerial approaches and technical approaches. Managerial approaches mainly require labor intensive activities such as daily inspections and recordings. Technical approaches rely on systems and software that record the product information including shelf-life and post alerts based on pre-defined compliance rules. However, current software and systems do not provide adequate product information and tracking and are vulnerable to data manipulation and tampering or other security threats.

SUMMARY

One example embodiment may include a method comprising one or more of identifying a production date associated with a product, creating a unique code to represent the production date and the product based on a hash of one or more blocks of a blockchain, and forwarding the unique code to a verification server to verify the product.

Another example embodiment may include an apparatus configured to perform one or more of identify a production date associated with a product, create a unique code to represent the production date and the product based on a hash of one or more blocks of a blockchain, and a transmitter configured to forward the unique code to a verification server to verify the product.

Still another example embodiment may include a non-transitory computer readable storage medium configured to store instructions that when executed cause a processor to perform one or more of identifying a production date associated with a product, creating a unique code to represent the production date and the product based on a hash of one or more blocks of a blockchain, and forwarding the unique code to a verification server to verify the product.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide product tracking operations which use blockchain transactions to verify dates and other attributes of product creation. The blockchain transactions provide a basis for tracking products and ensuring the creation dates, shelf-life information and other critical and non-critical information can be identified for every event that occurs with respect to a product. The traceability configuration of the example embodiment can remain transparent to all relevant stakeholders/third parties, and the recorded product information will be difficult, if not impossible, to be tampered or fraudulently modified. Based on a smart contract of the instant application, accurate and tamper-proof shelf-life management can be achieved.

Figure 1A:
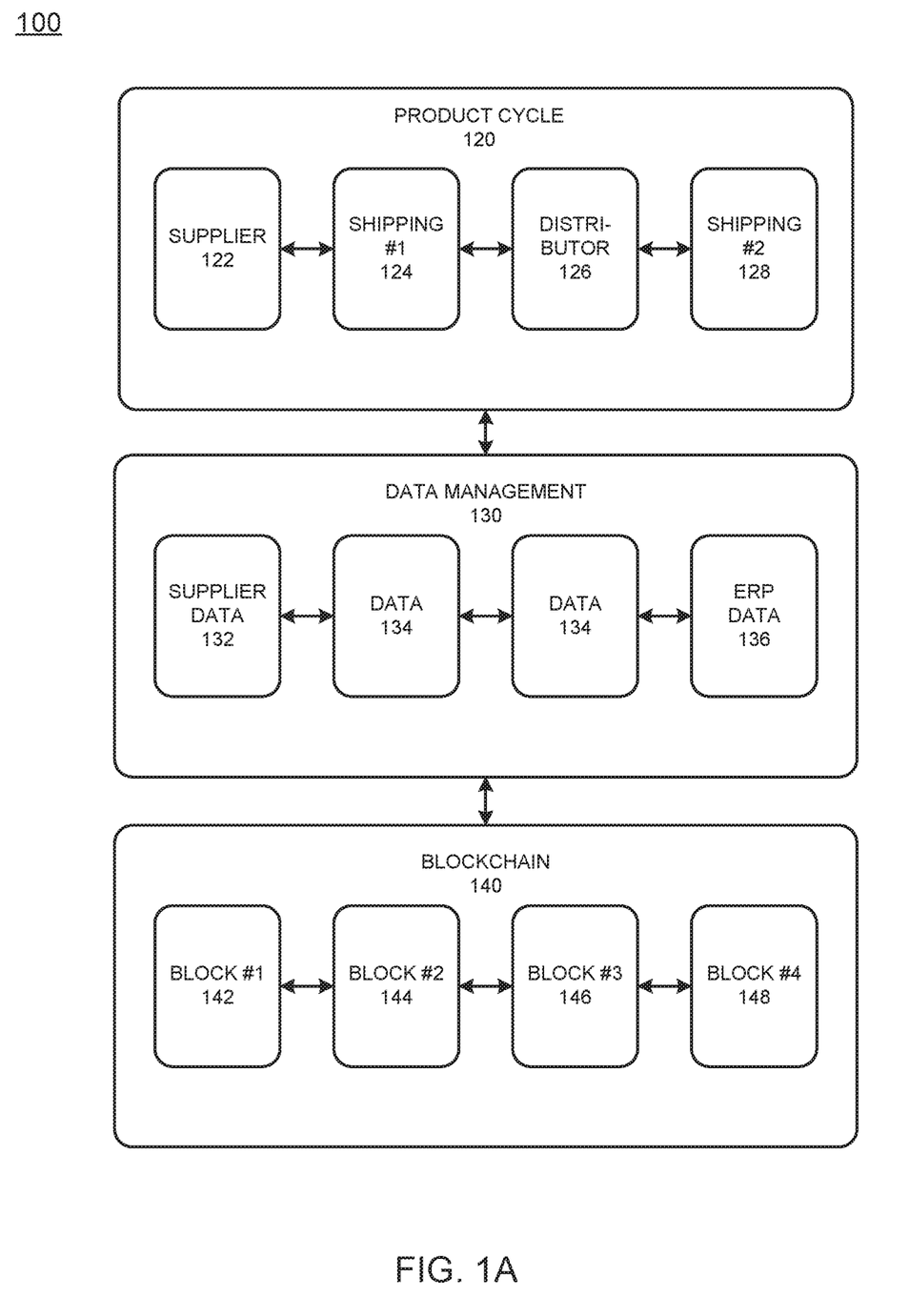
FIG. 1A illustrates a product creation cycle and data management cycle paralleling blockchain transactions according to example embodiments.

FIG. 1A illustrates a product creation cycle and data management cycle paralleling blockchain transactions according to example embodiments. Referring to FIG. 1A, the system 100 includes a product cycle sub-system 120 which provides a supplier or supplier computer 122, a shipping company or shipping company computer 124, a distributor entity or distributor entity computer 126 and one or more additional shipping entities or one or more additional shipping entity computers 128. Each time the product experiences an event, such as creation, shipping, registration, etc., the data generated may identified and stored in a computer network of data processing and management subsystem 130. For example, the supplier data 132 and the data 134 extracted from any of the supply chain entities of the product cycle may be received and processed by a database enterprise resource planning entity 136, etc. Such product data could be referenced with existing blockchain data based on date and/or other factors for selecting a particular blockchain block and transaction as a basis for a hash to use when referencing a product identification code (i.e., UPC, QR, bar code, etc.). Blocks 142-148 from a ledger 140 may be identified as corresponding to a particular date and time and used as the basis for a borrowed hash to be associated with a product code.

Figure 1B:
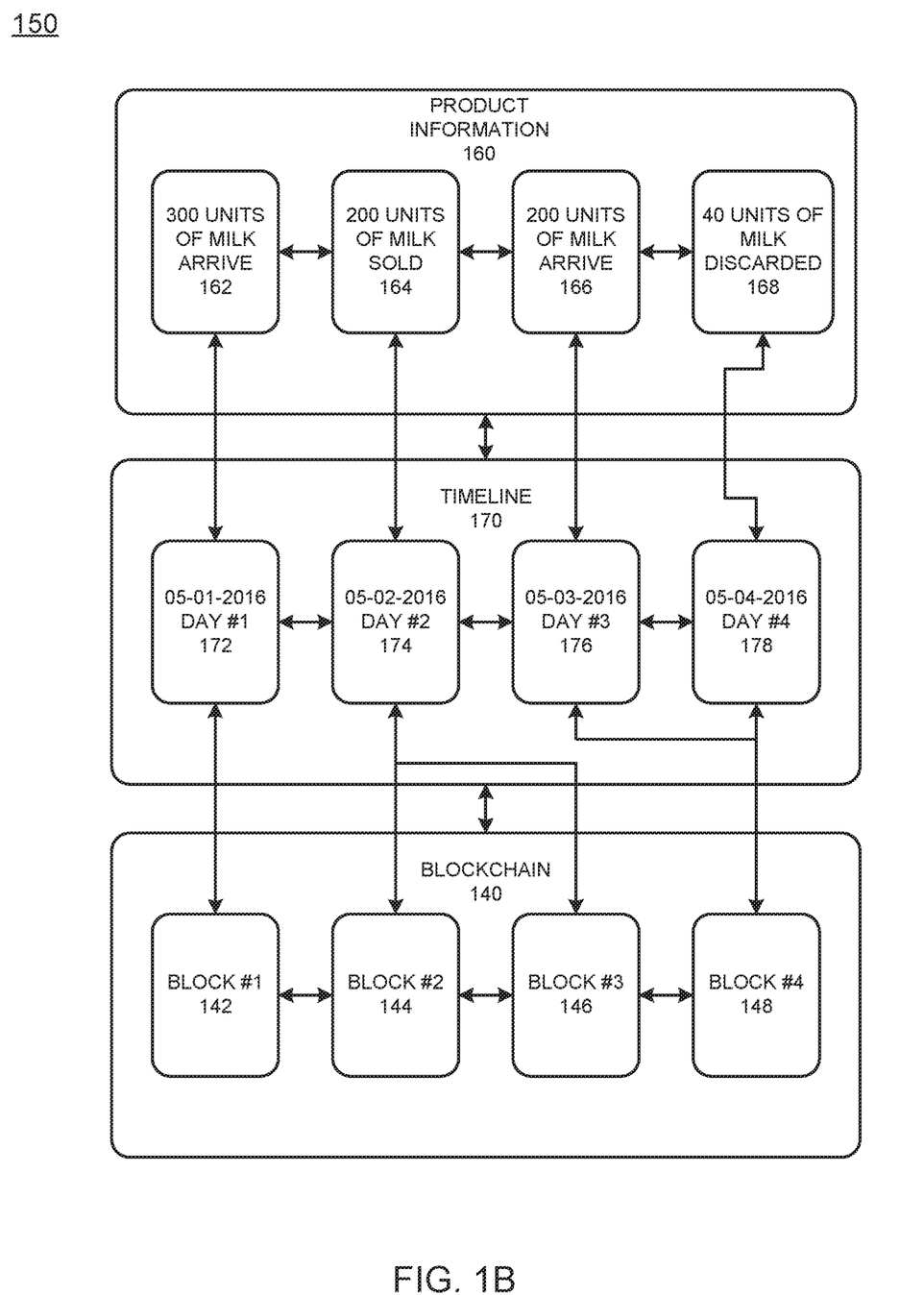
FIG. 1B illustrates a product creation cycle and timeline paralleling blockchain transactions according to example embodiments.

FIG. 1B illustrates a product creation cycle and timeline paralleling blockchain transactions according to example embodiments. In this example 150, the product information is linked to a particular time and transaction. The product information 160 may include a number of units associated with a production cycle, delivery or other product event. The example illustrates a market which may receive a number of units (for example, 300 units) of milk 162 on a first day 172, 200 units 164 are sold the next day 174, 200 units are received 166 the next day 176 and 40 units are discarded due to an expiration date 168 on the fourth day 178. Each day of product transactions, such as arrivals, sales, discards, etc., may be linked to a blockchain hash code or sub-code to ensure the immutable nature of the transaction and to accurately link the transaction to a particular date since blockchain transactions 142-148 are immutable and are linked to dates. The events may be linked to transactions in the blockchain on a single day and/or time or across multiple days and/or times depending on the transaction.

Any blockchain transaction can be the basis for verification purposes as long as its hash code can be verified. Also, requirements regarding the transaction frequency (e.g., at least one block formed every day) may be used as the basis for a random code to be provided every time period (e.g., every day). Blocks which may be the basis for product verification can be based on a time frame (e.g., last 5 digits of the 3rd block generated between 2 pm-3 pm, Oct. 23, 2016) and the rule can change dynamically or randomly. In this case, the rule (or process) can be recorded into the blockchain and will be translated into a hash code for auditor's reference. Regardless of the approach used, a completed hash from a block specified by the rule can be the basis for product creation date/expiration date.

Figure 1C:
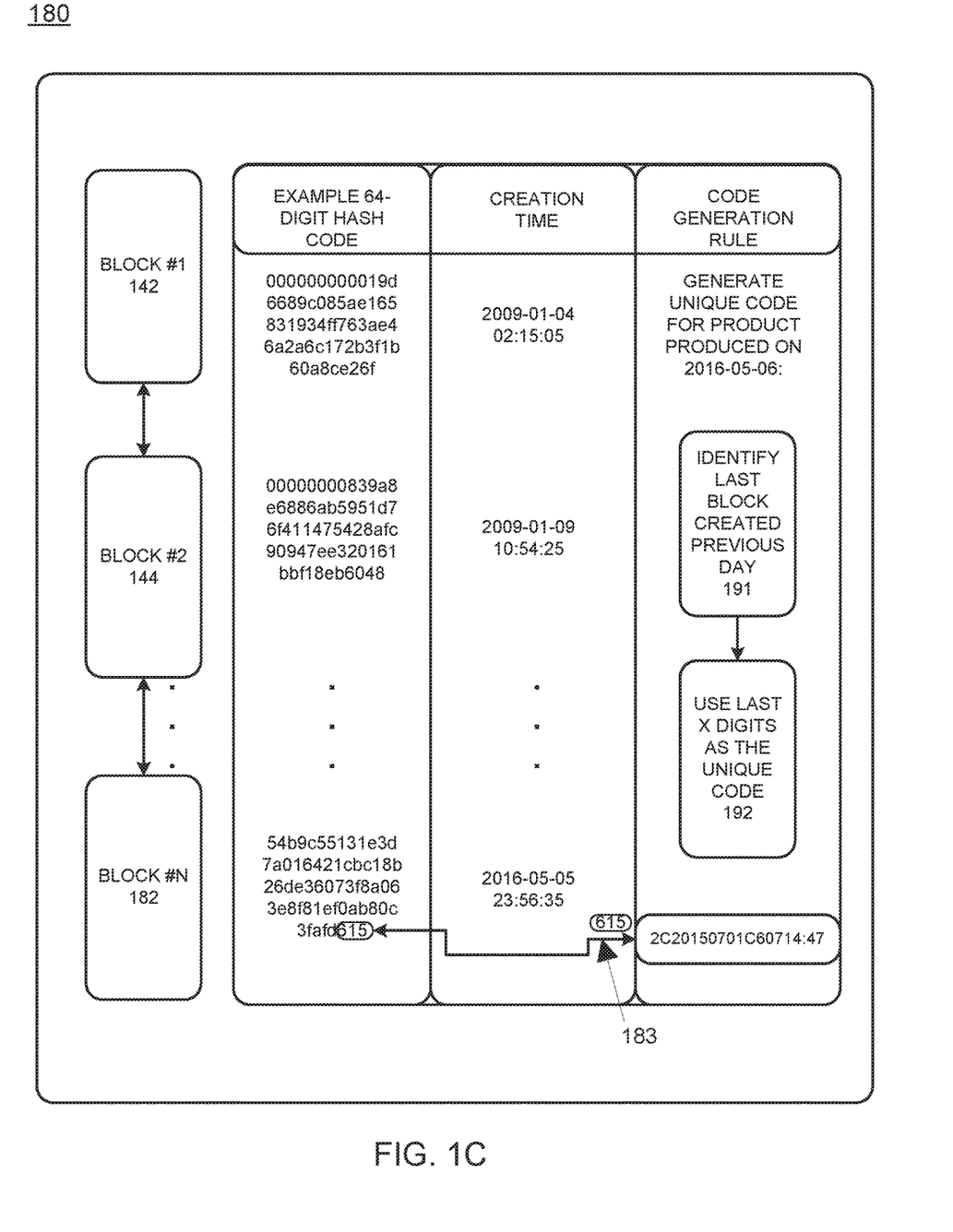
FIG. 1C illustrates a blockchain hash identification procedure used to track products according to example embodiments.

FIG. 1C illustrates a blockchain hash identification procedure used to track products according to example embodiments. Referring to FIG. 1C, the illustration 180 includes blockchain blocks 142, 144 to #N 182 which are identified by their hash and creation time/date. The code generation rule may generate a unique code for the product produced on a particular date. One approach may be to identify the date, identify a block in the shared ledger as a last block on that day or a previous day 191. The last 'X' number of digits are then identified 192 as '615' (see identifier 183) and linked to the unique product code to create a hash enhanced product code combining the sub-hash '615' and the product code.

Figure 2:
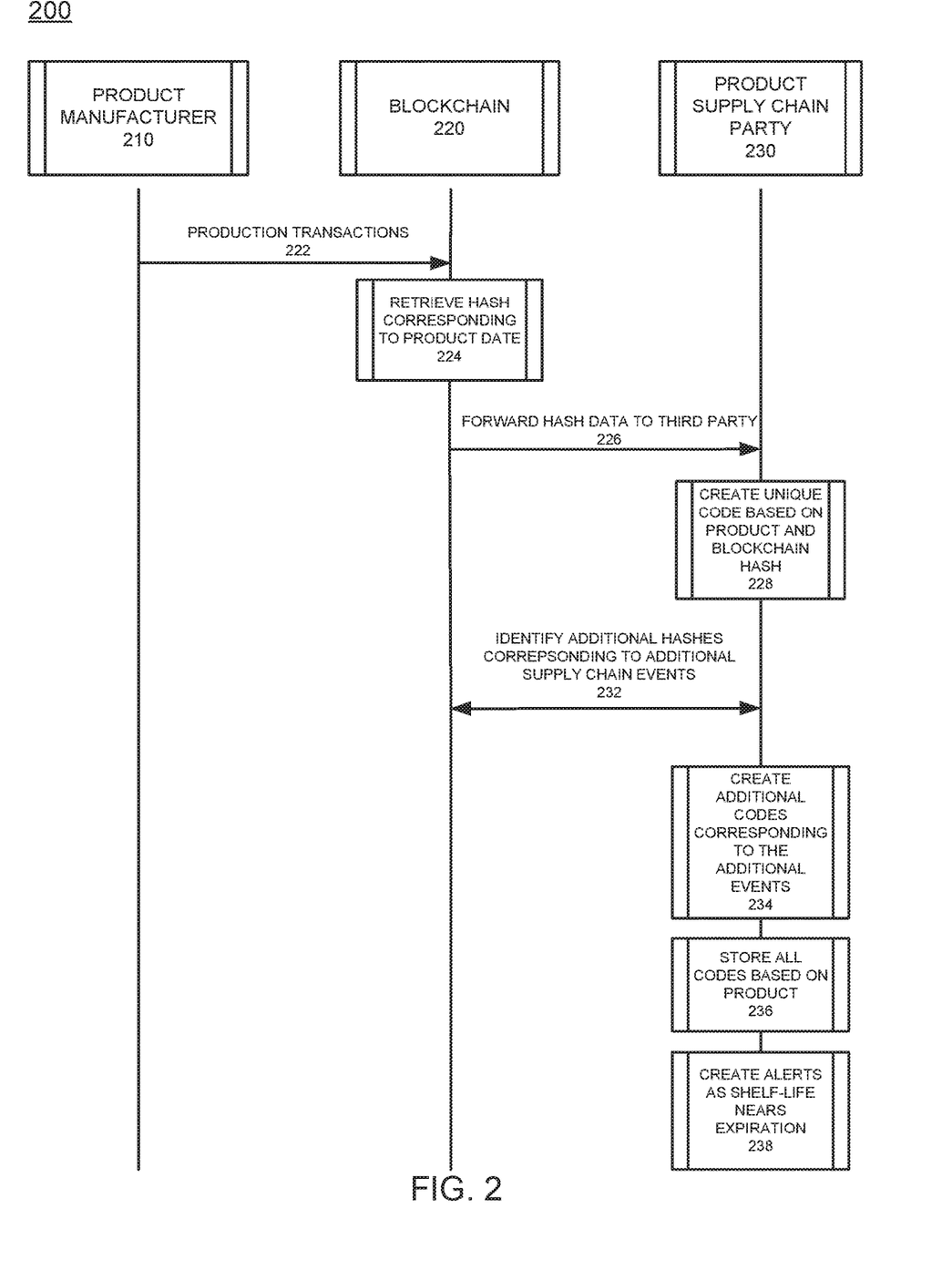
FIG. 2 illustrates a system signaling diagram illustrating a process for tracking products with a blockchain according to example embodiments.

FIG. 2 illustrates a system signaling diagram 200 illustrating a process for tracking products with a blockchain according to example embodiments. Referring to FIG. 2, a product manufacturer or product manufacturer computer 210 may one of many initial parties responsible for production and product shipment to a sales entity. The product transactions 222 may be identified as codes corresponding to units of various products. A blockchain 220, located on a computer (not shown), can be referenced for hash information corresponding to a product date 224. The date can be one day prior, the same day, the same hour, etc., as long as the correlation between the blockchain transaction and the product information is understood. The hash is forwarded 226 to the product supply chain party or supply chain computer 230 and used to create a unique code based on the hash and the product code 228. The events that follow may require additional hashes to be retrieved 232 and correlate with the product code to log those additional events, such as changes to the supplier, shipping, changing ownership/custody, etc. The additional codes corresponding to the additional events 234 are generated with a new hash to complete the event logging process. All codes are stored based on the product(s) being tracked 236. The nearing shelf-life dates may trigger a notification alert to any interested parties. Also, as a shelf-life event nears its end date, a threshold date (48, 72 hours, etc.) may be used to notify individuals who have applications setup to receive such alerts 238 for a retailer or other venue where they can purchase a potentially discounted product.

Blockchain based product traceability and shelf-life management should be "immune" to product information tampering. By selecting a public blockchain platform and collecting data (e.g., hash of blocks) from the platform, a unique code can be randomly generated for a product produced on a date and/or time using elements of the hash of blocks and which include the unique code on the product. The code can be verified with the unique code for the product based on the public blockchain data which offers date and time verification.

Figure 3A:
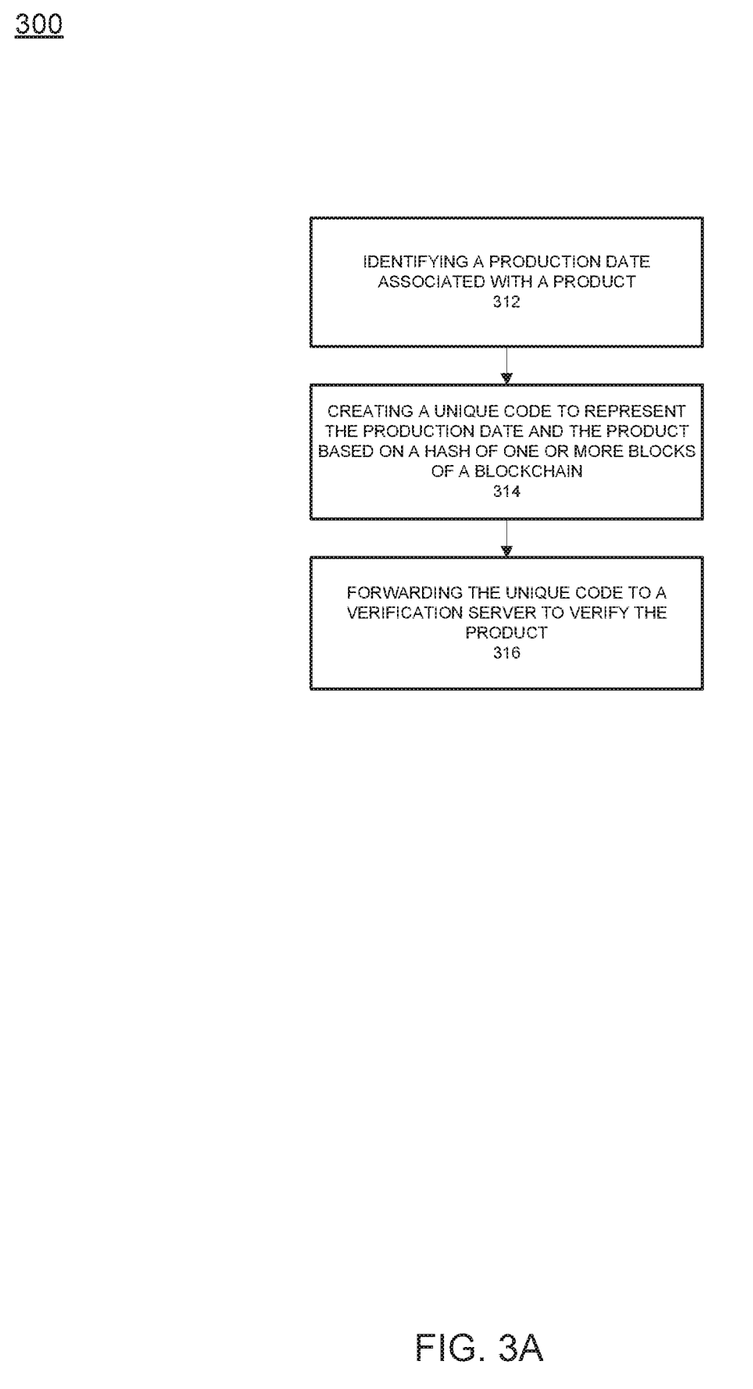
FIG. 3A illustrates a flow diagram of an example method of tracking products according to example embodiments.

FIG. 3A illustrates a flow diagram of an example method of tracking products according to example embodiments. Referring to FIG. 3A, the method 300 may include one or more of identifying a production date associated with a product 312, creating a unique code to represent the production date and the product based on a hash of one or more blocks of a blockchain 314 and forwarding the unique code to a verification server to verify the product 316. The unique code is a randomly generated code. The method may also include selecting the one or more blocks from the blockchain, and retrieving the hash of the selected blocks. When creating the unique code, the unique code is randomly generated based on the retrieved hash of the one or more blocks. The method may also include storing the unique code in the blockchain and the product could be a perishable product with a shelf-life period of time. The method may also include creating a shelf-life period of time starting from the production date, creating an alert when the period of time has expired, and transmitting the alert to an interested party identified from the unique code.

Figure 3B:
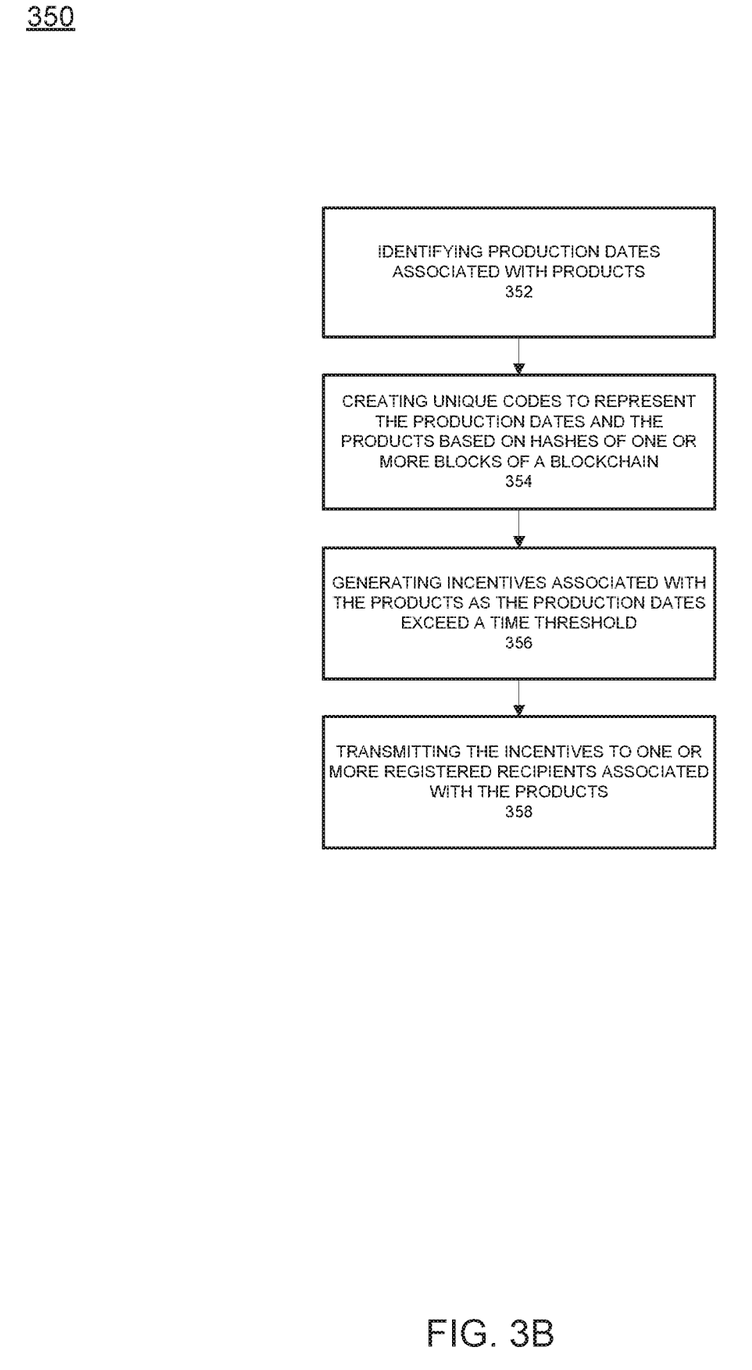
FIG. 3B illustrates a flow diagram of an example method of tracking product expiration according to example embodiments.

FIG. 3B illustrates a flow diagram 350 of an example method of tracking product expiration according to example embodiments. Referring to FIG. 3B, the method may include one or more of identifying production dates associated with products 352, creating unique codes to represent the production dates and the products based on hashes of one or more blocks of a blockchain 354, generating incentives associated with the products as the production dates exceed a time threshold 356, and transmitting the incentives to one or more registered recipients associated with the products 358. In this example, the shelf-life thresholds may dictate an action to take at a particular time to alert those interested parties that a price reduction for a product about to expire is available in their geographic region. This provides shoppers with an opportunity to seek out those products expiring for a reduced price.

The process may include one or more of selecting a public blockchain platform, collecting data, such as the hash of blocks from the platform, generating an anti-faking code that cannot be modified due to the data used from the blockchain, and the code may also be further customized by the product code procedures desired by the entity setting the code. The code can then be scanned for verification by a system that can identify the blockchain data, along with the original product code data. The device performing such a function may have a hash collector function, an encoder, a customization tool, a decoder and a verifier. The anti-counterfeiting code is generated randomly at a specific time and cannot be predicted due to the nature of the time and block usage. The code is not owned by a central system. The code will be immutable since the blockchain cannot be changed. Code data may include a plant or manufacturer identifier (facility) and a date, time and line # (product line data). The hash value may be encoded to include several digits of a hexadecimal value of a last block created in a particular time frame (e.g., last 10 minutes, etc.). The code is printed on the product package. The rules for managing the code and selecting data from the blockchain may be dynamic and be based on a consensus algorithm. Any consumer or other party can verify the data via a smartphone application setup to decode the code based on the known process or algorithm.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
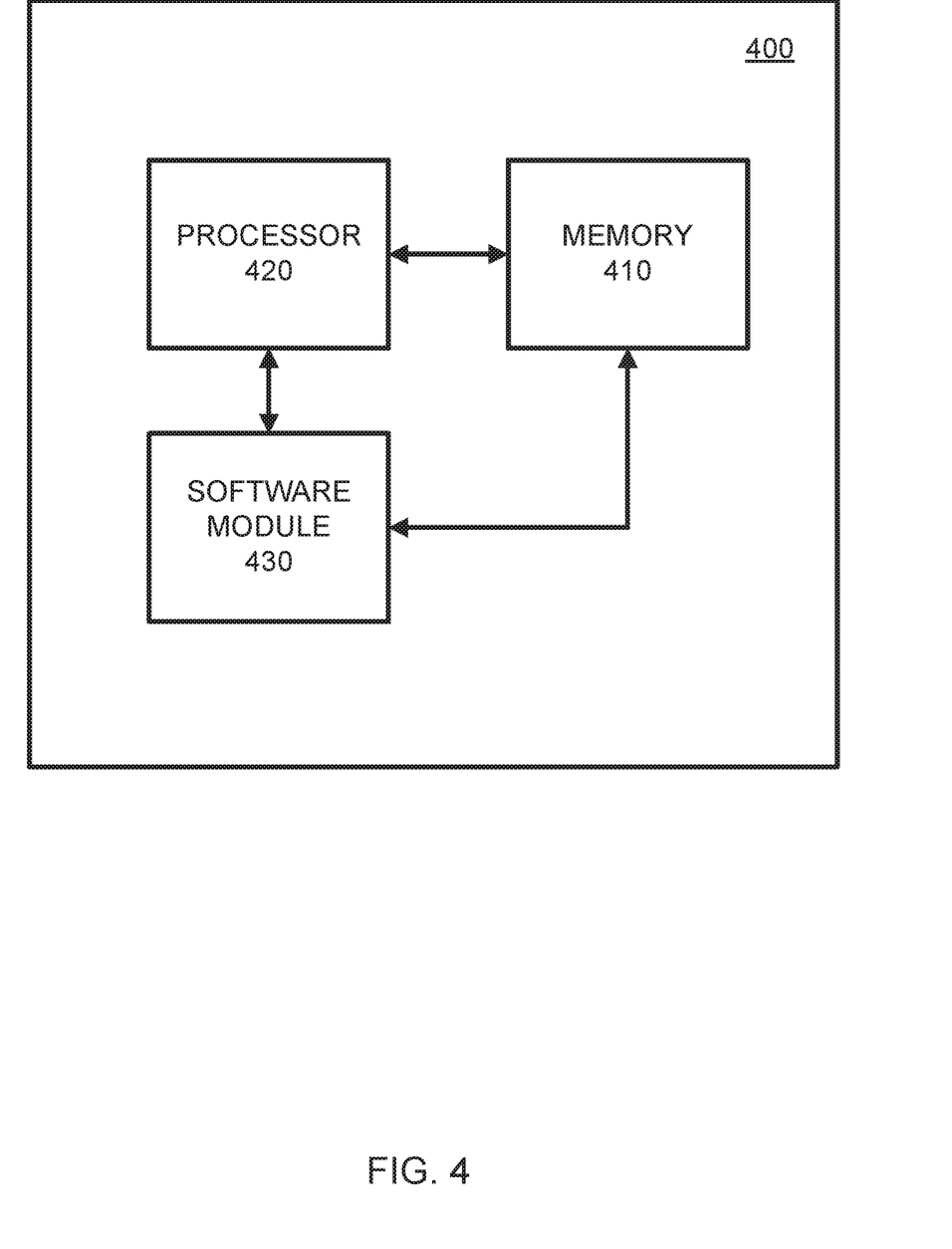
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method implemented by a computing system, the method comprising:
   identifying a last block created in a particular time period in a ledger of a blockchain, the last block containing a hash value, a production date of a product, and a production time of the product;
   periodically generating, using a rule stored on the blockchain, an enhanced product code representing the production date, the production time, and the product based on a sub-hash of the hash of the last block and a unique product code of the product; and
   forwarding the enhanced product code to a verification server to verify the product.

2. The method of claim 1, further comprising:
   selecting the one or more blocks from the blockchain; and
   retrieving the hash of the one or more blocks.

3. The method of claim 1, further comprising:
   storing the enhanced product code in the blockchain.

4. The method of claim 1, wherein the product is a perishable product with a shelf-life period of time.

5. The method of claim 1, further comprising:
   creating a shelf-life period of time starting from the production date;
   creating an alert when the period of time has expired; and
   transmitting the alert to an interested party identified from the enhanced product code.

6. The method of claim 1, wherein the rule is changed dynamically or randomly.

7. The method of claim 6, wherein the hash of the one or more blocks specified by the rule provides a basis for a creation date and an expiration date of the product.

8. The method of claim 1, wherein the sub-hash comprises a predetermined number of last digits of the hash.

9. An apparatus, comprising:
   a processor configured to:
   identify a last block created in a particular time period in a ledger of a blockchain, the last block containing a hash value, a production date of a product, and a production time of the product;
   periodically generate, using a rule stored on the blockchain, an enhanced product code representing the production date, the production time, and the product based on a sub-hash of the hash of the last block and a unique product code of the product; and
   forward the enhanced product code to a verification server to verify the product.

10. The apparatus of claim 9, wherein the processor is further configured to:
    select the one or more blocks from the blockchain; and
    retrieve the hash of the one or more blocks.

11. The apparatus of claim 9, wherein the processor is further configured to:
    store the enhanced product code in the blockchain.

12. The apparatus of claim 9, wherein the product is a perishable product with a shelf-life period of time.

13. The apparatus of claim 9, wherein the processor is further configured to:
    create a shelf-life period of time that starts from the production date; and
    create an alert when the period of time has expired, wherein
    the transmitter is further configured to transmit the alert to an interested party identified from the enhanced product code.

14. A non-transitory computer readable storage medium storing one or more instructions that when executed by a processor cause a processor to perform:
    identifying a last block created in a particular time period in a ledger of a blockchain, the last block containing a hash value, a production date of a product, and a production time of the product;
    periodically generating, using a rule stored on the blockchain, an enhanced product code representing the production date, the production time, and the product based on a sub-hash of the hash of the last block and a unique product code of the product; and
    forwarding the enhanced product code to a verification server to verify the product.

15. The non-transitory computer readable storage medium of claim 14, wherein the one or more instructions are further configured to cause the processor to perform:
    selecting the one or more blocks from the blockchain; and
    retrieving the hash of the one or more blocks.

16. The non-transitory computer readable storage medium of claim 14, wherein the one or more instructions are further configured to cause the processor to perform:
    storing the enhanced product code in the blockchain.

17. The non-transitory computer readable storage medium of claim 14, wherein the one or more instructions are further configured to cause the processor to perform:
    creating a shelf-life period of time starting from the production date;
    creating an alert when the period of time has expired; and
    transmitting the alert to an interested party identified from the unique code, and wherein the product is a perishable product with a shelf-life period of time.

* * * * *